(12) United States Patent
Zhang et al.

(10) Patent No.: US 10,308,127 B2
(45) Date of Patent: Jun. 4, 2019

(54) ELECTRIC VEHICLE CHARGING PILE CONTROL SYSTEM AND METHOD CONSIDERING GRID FREQUENCY SAFETY

(71) Applicant: SHANDONG UNIVERSITY, Jinan (CN)

(72) Inventors: Hengxu Zhang, Jinan (CN); Zongshuai Jin, Jinan (CN); Yingle Fan, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 15/570,489

(22) PCT Filed: May 5, 2016

(86) PCT No.: PCT/CN2016/081148
§ 371 (c)(1),
(2) Date: Oct. 30, 2017

(87) PCT Pub. No.: WO2016/180271
PCT Pub. Date: Nov. 17, 2016

(65) Prior Publication Data
US 2018/0147951 A1    May 31, 2018

(30) Foreign Application Priority Data
May 8, 2015 (CN) .......................... 2015 1 02334976

(51) Int. Cl.
*H02J 7/00* (2006.01)
*B60L 11/18* (2006.01)
(Continued)

(52) U.S. Cl.
CPC ........... *B60L 11/1844* (2013.01); *B60L 53/63* (2019.02); *B60L 55/00* (2019.02); *G01S 19/13* (2013.01);
(Continued)

(58) Field of Classification Search
CPC .................................................. B60L 11/1844
(Continued)

(56) References Cited

U.S. PATENT DOCUMENTS

2012/0229089 A1    9/2012 Bemmel et al.
2016/0272084 A1*   9/2016 Chuang .................. B60K 11/04

FOREIGN PATENT DOCUMENTS

CN     102412606 A    4/2012
CN     102891495 A    1/2013
(Continued)

OTHER PUBLICATIONS

International Search Report dated Jul. 27, 2016 for International Application No. PCT/CN2016/081148 filed May 5, 2016, 4 pages.

*Primary Examiner* — Suresh Memula
(74) *Attorney, Agent, or Firm* — Knobbe, Martens, Olson & Bear, LLP

(57) ABSTRACT

The invention discloses an electric vehicle charging pile control system and method considering grid frequency safety. The electric vehicle charging pile control system comprises a grid single-phase power input port, a voltage transformer, an AD conversion chip, a first data processor and a second data processor connected successively; the first data processor is further connected with a data real-time display device and a GPS/Beidou signal receiver respectively; the second data processor communicates with an electric vehicle charging pile and an electric vehicle battery pack respectively; and the second data processor is further connected with a man-machine interaction device. The invention has the beneficial effects that: the frequency of a power system can be monitored in real time; when the frequency is relatively low after a fault of the power system, part of unimportant electric vehicle charging loads are cut off to reduce the active power vacancy of the system;

(Continued)

low-frequency load reduction is effectively prevented; and the time for restoring the frequency of the power system is shortened.

9 Claims, 10 Drawing Sheets

(51) Int. Cl.
    *G01S 19/13*     (2010.01)
    *H02J 3/14*     (2006.01)
    *H02J 3/32*     (2006.01)
    *H02J 7/34*     (2006.01)
    *B60L 55/00*     (2019.01)
    *B60L 53/63*     (2019.01)

(52) U.S. Cl.
    CPC .................. *H02J 3/14* (2013.01); *H02J 3/32* (2013.01); *H02J 7/0026* (2013.01); *H02J 7/0027* (2013.01); *H02J 7/34* (2013.01); *B60L 2240/622* (2013.01); *Y02B 70/3225* (2013.01); *Y02E 60/721* (2013.01); *Y02T 10/7055* (2013.01); *Y02T 90/168* (2013.01); *Y04S 10/126* (2013.01); *Y04S 20/222* (2013.01); *Y04S 30/12* (2013.01)

(58) Field of Classification Search
    USPC ......................................................... 320/109
    See application file for complete search history.

(56) References Cited

FOREIGN PATENT DOCUMENTS

| | | |
|---|---|---|
| CN | 103217608 A | 7/2013 |
| CN | 104393656 A | 3/2015 |
| CN | 104410064 A | 3/2015 |
| CN | 104836292 A | 8/2015 |

* cited by examiner

ELECTRIC VEHICLE CHARGING PILE CONTROL SYSTEM AND METHOD CONSIDERING GRID FREQUENCY SAFETY

FIELD OF THE INVENTION

The present invention relates to the field of charging technology of electric vehicles, and particularly relates to an electric vehicle charging pile control system and method considering grid frequency safety.

BACKGROUND OF THE INVENTION

In order to guarantee the safety and the stability of a power system, Chinese grid construction is planned and configured according to three defense lines, and grid safety operation is also scheduled and managed according to the three defense lines. Chinese power systems have been rapidly developed in recent years, mass introduction of intermittent renewable energy power generation ways such as wind power generation, photovoltaic power generation and the like increases the complexity of grid characteristics, and they are substantially un-schedulable and equivalent to random disturbance sources, greatly influence the reliability operation of grids, and increase the grid scheduling difficulty. With the construction of smart grids, the requirement of users for power supply quality also rises. Planning and constructing the grids based on the traditional three defense lines cannot well meet the construction requirements. Particularly, the low-frequency load reduction control measure in the third defense line not only seriously influences power supply of users, but also may remove part of important loads, resulting in major economic loss and safety accidents, so low-frequency load reduction should be avoided as much as possible.

Low-frequency load reduction: in order to prevent frequency collapse of a power system, when the frequency of the power system declines due to vacancy between power generation and the demand of electrical loads, part of secondary loads prearranged in the system are cut off successively according to a preset action frequency value, so that the active power of the system regains a tendency of balance and the frequency rises. In China, the low-frequency load reduction action is generally divided into 5~6 turns, the starting frequency of the first turn is set at 48.5~49.1 Hz, and the frequency of the last turn is 47.0~47.5 Hz.

In order to avoid the occurrence of unnecessary low-frequency load reduction, part of unimportant loads can be cut off before the low-frequency load reduction action caused by the degree of frequency decline, so that the vacancy of active power is reduced, the frequency stability of the system is improved, the low-frequency load reduction is avoided, and the economical loss is reduced to minimum.

Electric vehicle charging loads are ideal controllable loads. When the grid frequency declines greatly after fault, part of the electric vehicle charging loads can be cut off, to temporarily stop charging thereof and continue charging after the frequency is restored. In this way, not only can the low-frequency load reduction be effectively prevented, but also charging of an electric vehicle is not affected greatly.

At present, electric vehicle charging modes are divided into three modes, a slow charging mode, a fast charging mode and a battery replacing mode. Electric vehicle charging piles are divided into three types, an alternating-current charging pile and a direct-current charging pile, the alternating-current charging pile provides slow charging for electric vehicles, and the direct-current charging pile provides fast charging for electric vehicles and is applied most widely. Moreover, the output power of the direct-current charging pile is adjustable, multi-level power output can be achieved, and each level of power can be nearly seamlessly switched on line.

Hence, the charging pile is a controllable load for grids, its load power may be high or low, and reducing the output power of the charging pile is equivalent to cutting off part of charging loads, has the same effect as the low-frequency load reduction, but has little influence on users, and does not influence normal operation of loads.

Thus, the change of grid frequency is monitored in real time, and when the frequency declines greatly, the output power of the charging pile can be reduced or even charging is cut off in order to avoid the low-frequency load reduction action, so that the power difference of the power system is reduced, adjusting time is provided for the adjustment of the power system with a large time constant, and the frequency stability of the power system is improved. Moreover, the more the on-line charging electric vehicles are, the higher the adjustable charging load is, and the more obvious the above adjusting effect is.

Accordingly, it is quite necessary to design an electric vehicle charging pile control system considering grid frequency safety.

SUMMARY OF THE INVENTION

The object of the present invention is to solve the above problems and provide an electric vehicle charging pile control system and method considering grid frequency safety. The system and the method can autonomously determine the output power state of an electric vehicle charging pile on line according to the change condition of grid frequency, and switch between the multi-level charging power states, thereby improving the frequency safety of a grid after a fault and relieving the impact of the fault on the grid.

In order to achieve the above object, the present invention adopts the following technical solutions:

An electric vehicle charging pile control system considering grid frequency safety includes a grid single-phase power input port, a voltage transformer, an AD conversion chip, a first data processor, a second data processor, a data real-time display device, a GPS/Beidou signal receiver and a man-machine interaction device; the grid single-phase power input port, the voltage transformer, the AD conversion chip, the first data processor and the second data processor are connected successively; the first data processor is further connected with the data real-time display device and the GPS/Beidou signal receiver respectively; the second data processor communicates with an electric vehicle charging pile and an electric vehicle battery pack respectively; and the second data processor is further connected with the man-machine interaction device.

Operations of the first data processor include operations of the first data processor include a main program, second interrupt and sampling interrupt; the main program is used for calculating a frequency and sending frequency data to the second data processor via a serial port; the second interrupt is used for processing a GPS/Beidou time signal and calculating time; and the sampling interrupt is used for updating a sampling sequence and triggering frequency calculation.

Operations of the second data processor include a parameter setting interrupt program and a serial port interrupt program;

the parameter setting interrupt program is triggered by the man-machine interaction device, reads parameter data sent by the man-machine interaction device after being triggered, and then changes corresponding parameters of the charging control system; the serial port interrupt program is triggered by the first data processor, reads frequency data and time information sent by the first data processor after being triggered, then reads electric quantity data of the electric vehicle battery pack, and finally sends a power control signal to the charging pile according to a charging pile output power control strategy to adjust the output power of the charging pile in real time.

A control method for the electric vehicle charging pile control system considering grid frequency safety includes:

(1) the AD conversion chip converting a grid alternating-current voltage signal into a digital signal and storing the digital signal in the chip, thus accomplishing sampling of voltage;

(2) the first data processor reading voltage sampling data and current geographic information data, calculating the frequency of voltage based on the voltage sampling data and displaying the frequency of voltage;

(3) superimposing the frequency data onto the current geographic information data and then sending the superimposed data to the second data processor, and (4) the second data processor reading the frequency data of the first data processor, the geographic information data and the electric quantity data of the electric vehicle battery pack, and sending a power control signal to the charging pile according to a charging pile output power control strategy to adjust the output power of the charging pile in real time.

The specific method of calculating the frequency of voltage based on the voltage sampling data in step (2) includes:

(2-1) supposing that the frequency updating number is cal_num, the initial value of cal_num is 0, the current frequency estimated value is $f_{old}$, the initial value of $f_{old}$ is 50 Hz, the sampling number of each cycle of waves at the frequency is N and N is a positive integer;

(2-2) supposing a sampling sequence is V[M+N], wherein M+N is the length of the sampling sequence and M is a positive integer;

(2-3) calculating a phase sequence θ[M] using a recursive discrete Fourier phasor analysis method, wherein M is the length of the phase sequence;

(2-4) calculating a phase difference sequence Δθ[M] according to the phase sequence, wherein M is the length of the phase sequence; setting the phase difference as a constant quadratic equation: $\Delta\theta(k)=a_0+a_1 k+a_2 k^2$, wherein $a_0$, $a_1$ and $a_2$ are constant coefficients, and k=0, 1, 2, . . . , M; then indicating the phase difference sequence in a matrix form:

$$\begin{bmatrix} \Delta\theta_0 \\ \Delta\theta_1 \\ \ldots \\ \ldots \\ \Delta\theta_{M-1} \end{bmatrix} = \begin{bmatrix} 0 & 0 & 0 \\ 0 & 2-1 & 2^2-1 \\ \ldots & \ldots & \ldots \\ \ldots & \ldots & \ldots \\ 0 & (M-1)-1 & (M-1)^2-1 \end{bmatrix} \begin{bmatrix} a_0 \\ a_1 \\ a_2 \end{bmatrix};$$

abbreviating as Δθ=Xa, and calculating a coefficient matrix $a=[X^T X]^{-1} X^T \Delta\theta$, wherein $$a = \begin{bmatrix} a_0 \\ a_1 \\ a_2 \end{bmatrix};$$

(2-5) calculating a frequency offset Δf, and updating the frequency estimated value $f_{new}=f_{old}+\Delta f$;

(2-6) supposing $f_{old}=f_{new}$; adding 1 to the frequency updating number, namely cal_num=cal_num+1; if cal_num is equal to 2, ending the frequency calculation, wherein the calculation result is the newest frequency estimated value $f_{new}$; if cal_num is smaller than 2, entering step (2-7);

(2-7) adaptively reconstructing the waveform of the sampling sequence based on the newest frequency estimated value $f_{new}$ to obtain a sampling sequence V[M+N] corresponding to the newest frequency estimated value $f_{new}$;

(2-8) returning to step (2-2) for further calculation.

The specific method of adaptively reconstructing the waveform of the sampling sequence in step (2-7) includes:

(2-7-1) setting α as a phase interval of two sampling points at the new frequency $f_{new}$, calculating variants $$\text{oriInterval} = \frac{1}{N \times f_{old}} \text{ and newInterval} = \frac{1}{N \times f_{new}},$$

wherein $f_{new}$ is the newest frequency estimated value, $f_{old}$ is the previous frequency estimated value, and N is the sampling number of each cycle of waves;

(2-7-2) supposing that the current sampling sequence is $V_{old}$, a new sampling sequence to be calculated is $V_{new}$, and i=0;

(2-7-3) calculating a phase interval coefficient $$x = i \times \frac{\text{newInterval}}{\text{oriInterval}} - \text{resampleIndex},$$

wherein resampleIndex is a maximum integer not greater than $$i \times \frac{\text{newInterval}}{\text{oriInterval}};$$

(2-7-4) supposing $z_1=V_{old}$(resampleIndex), $z_2=V_{old}$(resampleIndex+1), i.e., $z_1$ and $z_2$ are respectively a resampleIndex element and a resampleIndex+1 element of the sampling sequence $V_{old}$;

(2-7-5) calculating the $i^{th}$ element value of $V_{new}$, wherein $$V_{new}(i) = z_1 \cos x\alpha + (z_2 - z_1 \cos\alpha)\frac{\sin x\alpha}{\sin\alpha};$$

(2-7-6) supposing i=i+1; if i is equal to M+N, ending the calculation, and obtaining a new sampling sequence $V_{new}$[M+N]; if i is smaller than M+N, returning to step (2-7-3) for further calculation.

The specific implementation method of step (3) includes: triggering, by a signal sent from the GPS/Beidou signal receiver to the first data processor, a second interrupt program of the first data processor, parsing, by the first data processor, data sent by the receiver to obtain time information of a whole second; then combining the frequency data and the time information into a data packet, and sending the data packet to the second data processor.

The charging pile output power control strategy in step (4) specifically includes: (4-1) judging whether a charging control function considering grid frequency safety is enabled, if so, entering step (4-2);

otherwise, judging whether the previous control signal is of "100% Ps state", if so, not sending a control signal, otherwise, sending a control signal of "100% Ps state";

(4-2) judging whether the time is within a charging control enabling time period according to the time information sent by the first data processor, if so, entering step (4-3);

otherwise, judging whether the previous control signal is of "100% Ps state", if so, not sending a control signal, otherwise, sending a control signal of "100% Ps state";

(4-3) judging whether the current electric quantity of the battery pack is greater than an electric quality limit value of the battery pack according to the electric quantity data information of the electric vehicle battery pack, if so, entering step (4-4);

if the current electric quantity is smaller than or equal to the electric quality limit value of the battery pack, judging whether the previous control signal is of "100% Ps state", if so, not sending a control signal, otherwise, sending a control signal of "100% Ps state"; and (4-4) judging a frequency safety state according to the frequency data sent by the first data processor in combination with a charging power control logic, and sending a power control signal to a charging circuit;

wherein Ps is the rated output power of the electric vehicle charging pile; and the "100% Ps state" indicates controlling the output power to be 100% of Ps.

The method of step (4-4) specifically includes:

a) when the previous control signal is of "0% Ps state", if the current frequency is smaller than or equal to a hysteresis upper limit frequency 1, not sending a control signal; if the current frequency is greater than or equal to the hysteresis upper limit frequency 1 and smaller than or equal to a hysteresis upper limit frequency 2, sending a control signal of "25% Ps state"; if the current frequency is greater than or equal to the hysteresis upper limit frequency 2 and smaller than or equal to a hysteresis upper limit frequency 3, sending a control signal of "50% Ps state"; if the current frequency is greater than or equal to the hysteresis upper limit frequency 3 and smaller than or equal to a hysteresis upper limit frequency 4, sending a control signal of "75% Ps state"; if the current frequency is greater than or equal to the hysteresis upper limit frequency 4, sending a control signal of "100% Ps state";

b) when the previous control signal is of "25% Ps state", if the current frequency is smaller than or equal to a hysteresis lower limit frequency 1, sending a control signal of "0% Ps state"; if the current frequency is greater than or equal to the hysteresis lower limit frequency 1 and smaller than or equal to the hysteresis upper limit frequency 2, not sending a control signal; if the current frequency is greater than or equal to the hysteresis upper limit frequency 2 and smaller than or equal to the hysteresis upper limit frequency 3, sending a control signal of "50% Ps state"; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";

c) when the previous control signal is of "50% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to a hysteresis lower limit frequency 2, sending a control signal of "25% Ps state"; if the current frequency is greater than or equal to the hysteresis lower limit frequency 2 and smaller than or equal to the hysteresis upper limit frequency 3, not sending a control signal; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";

d) when the previous control signal is of "75% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to a hysteresis lower limit frequency 3, sending a control signal of "50% Ps state"; if the current frequency is greater than or equal to the hysteresis lower limit frequency 3 and smaller than or equal to the hysteresis upper limit frequency 4, not sending a control signal; if the current frequency is greater than or equal to the hysteresis upper limit frequency 4, sending a control signal of "100% Ps state";

e) when the previous control signal is of "100% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to the hysteresis lower limit frequency 3, sending a control signal of "50% Ps state"; if the current frequency is greater than or equal to the hysteresis lower limit frequency 3 and smaller than or equal to a hysteresis lower limit frequency 4, sending a control signal of "75% Ps state"; if the current frequency is greater than or equal to the hysteresis lower limit frequency 4, not sending a control signal;

wherein the frequency of the first turn of action of low-frequency load reduction of the power system is smaller than the hysteresis lower limit frequency 1, which is smaller than the hysteresis upper limit frequency 1, which is smaller than the hysteresis lower limit frequency 2, which is smaller than the hysteresis upper limit frequency 2, which is smaller than the hysteresis lower limit frequency 3, which is smaller than the hysteresis upper limit frequency 3, which is smaller than the hysteresis lower limit frequency 4, which is smaller than the hysteresis upper limit frequency 4, which is smaller than 50 Hz; Ps is the rated output power of the electric vehicle charging pile, the "100% Ps state" indicates that the output power is 100% of Ps, and so on.

The present invention has the following beneficial effects:

The present invention can monitor the frequency of the power system in real time; when the frequency is relatively low after a fault of the power system, part of unimportant electric vehicle charging loads are cut off, so that the vacancy of active power of the system is reduced; low-frequency load reduction is effectively prevented; the time for restoring the frequency of the power system after the fault is shortened; the frequency stability of the power system after the fault is improved; and the economic loss is greatly reduced.

The frequency safety state is judged on the basis of on-line measured grid frequency, and the charging power of the electric vehicle charging pile is controlled according to the grid frequency safety state. The electric vehicle charging pile control system autonomously determines the output power state of the electric vehicle charging pile on line according to the change condition of grid frequency, and switches between the multi-level charging power states. Thus, the frequency safety of a grid after the fault is improved, and the impact of the fault on the grid is relieved.

DETAILED DESCRIPTION OF THE EMBODIMENTS

The present invention will be further described below in combination with the accompanying drawings and embodiments.

Figure 1:
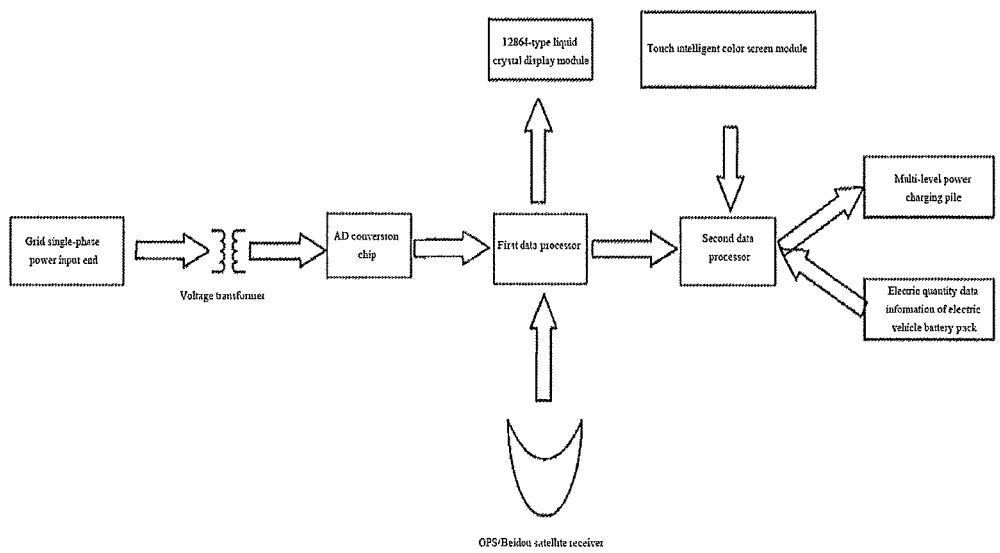
FIG. 1 is a principle diagram of an electric vehicle charging pile control system.

As shown in FIG. 1, an electric vehicle charging pile control system considering grid frequency safety includes a grid single-phase power input port, a voltage transformer, an AD conversion chip, a first data processor, a second data processor, a frequency real-time display interface, a GPS/Beidou signal receiver and a man-machine interaction device.

The grid single-phase power input port is used for introducing single-phase alternating-current electrical signals of a distribution network, and the allowable range of an input voltage is 30V-300V.

The voltage transformer transforms the input alternating-current voltage into alternating-current voltage suitable for input to the AD conversion chip, and the present invention adopts a precision micro voltage transformer with model No. ZMPT107, which has a rated input current of 2 mA, a rated output current of 2 mA and a transformation ratio of 1000:1000.

The AD conversion chip converts a voltage signal output by the voltage transformer into a digital signal and stores the digital signal in the chip to accomplish sampling of voltage, the first data processor reads the digital signal stored by the AD conversion chip in a serial mode, the present invention adopts a chip with model No. CS5460A as the AD conversion chip, and the CS5460A is a 24 bit AD chip and is high in precision and fast in speed.

The frequency real-time interface is used for displaying grid frequency information in real time, the present invention adopts a 12864-type liquid crystal display module as the display interface, and the first data processor controls the display content of the display module in a serial mode.

The GPS/Beidou signal receiver is used for receiving geographic information synchronous signals, and the present invention adopts a Beidou+GPS dual-mode receiving antenna.

The first data processor reads sampling data of the AD conversion chip, updates a sampling sequence, receives geographic information data sent by the GPS/Beidou signal receiver, then calculates the frequency of voltage based on the sampling sequence, marks the frequency data with time scales, sends the frequency data to the second data processor via an RS232 serial port, and displays the frequency data in real time on the frequency real-time interface. The first data processor is of model TMS320F28335. The frequency is calculated 25 times every second, namely once every 40 milliseconds.

Figure 2:
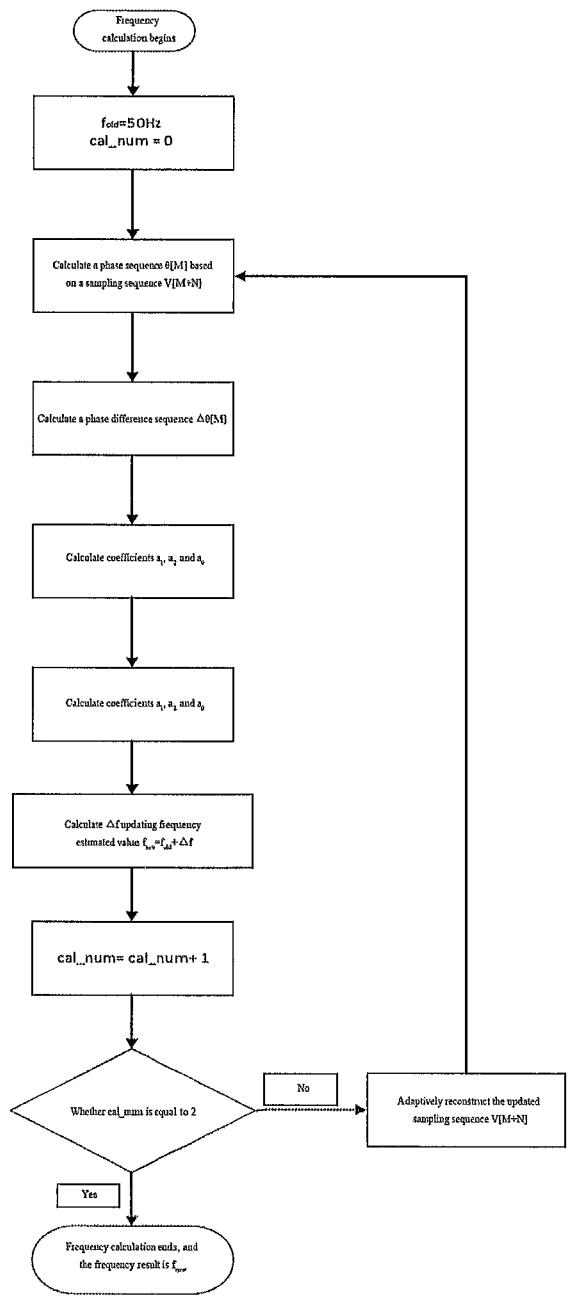
FIG. 2 is a flow diagram of frequency calculation.

The frequency calculation flow diagram is shown in FIG. 2. It is supposed that the frequency updating number is cal_num, the initial value of cal_num is 0, the current frequency estimated value is $f_{old}$, the initial value of $f_{old}$ is 50 Hz and the sampling number of each cycle of waves at the frequency is N. The specific frequency calculation steps are as follows:

(1) supposing a sampling sequence is V[M+N], wherein M+N is the length of the sampling sequence, and M and N are positive integers;

(2) calculating a phase sequence θ[M] using a recursive discrete Fourier phasor analysis method, wherein M is the length of the phase sequence;

(3) calculating a phase difference sequence Δθ[M] using the following formula:

$$\Delta\theta(n)=\theta(n)-\theta(0) n=0,1,\ldots,M-1,$$

wherein M is the length of the phase difference sequence;
(4) setting the phase difference as a constant quadratic equation: $\Delta\theta(k)=a_0+a_1 k+a_2 k^2$, wherein $a_0$, $a_1$ and $a_2$ are constant coefficients; calculating a coefficient matrix $a=[X^T X]^{-1} X^T \Delta\theta$ using the following formula $$\begin{bmatrix} \Delta\theta_0 \\ \Delta\theta_1 \\ \ldots \\ \ldots \\ \Delta\theta_{M-1} \end{bmatrix} = \begin{bmatrix} 0 & 0 & 0 \\ 0 & 2-1 & 2^2-1 \\ \ldots & \ldots & \ldots \\ \ldots & \ldots & \ldots \\ 0 & (M-1)-1 & (M-1)^2-1 \end{bmatrix} \begin{bmatrix} a_0 \\ a_1 \\ a_2 \end{bmatrix};$$

abbreviated as Δθ=Xa,
wherein $$a = \begin{bmatrix} a_0 \\ a_1 \\ a_2 \end{bmatrix};$$

(5) calculating a frequency offset $$\Delta f = \frac{1}{2\pi} N \times f_{old} \times (a_1 + 2 a_2 k),$$

wherein k=M;
(6) determining the newest frequency estimated value $f_{new}=f_{old}+\Delta f$;
(7) $f_{old}=f_{new}$;
(8) adding 1 to the frequency updating number, namely cal_num=cal_num+1; if cal_num is equal to 2, ending the frequency calculation, wherein the calculation result is the newest frequency estimated value $f_{new}$; if cal_num is smaller than 2, entering step 0;

(9) adaptively reconstructing the waveform of the sampling sequence based on the newest frequency estimated value $f_{new}$ to obtain a sampling sequence V[M+N] corresponding to the newest frequency estimated value $f_{new}$;
(10) returning to step 0 for further calculation.

Figure 3:
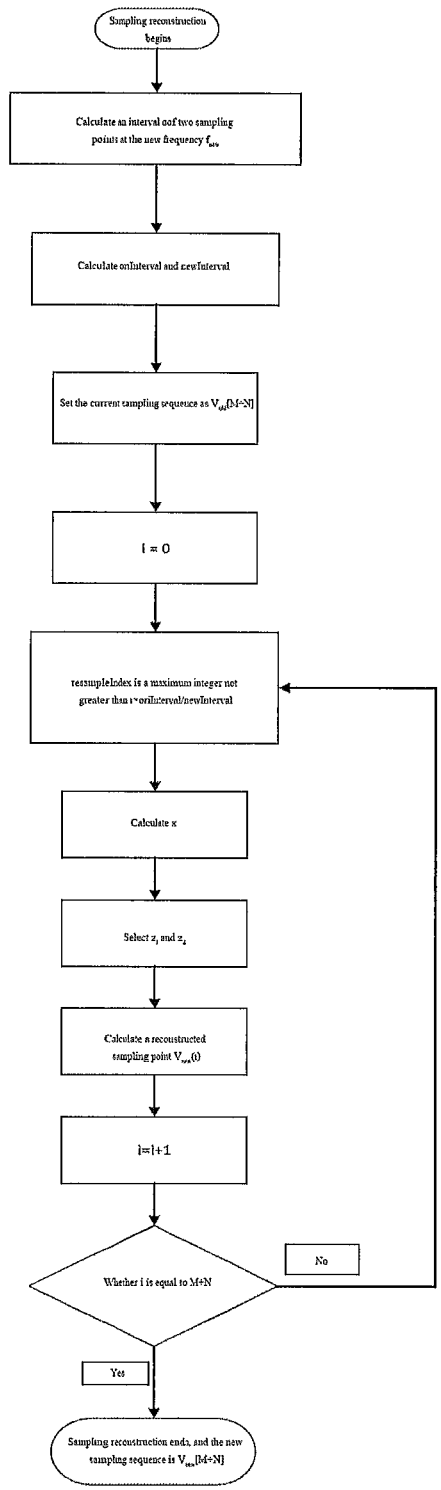
FIG. 3 is a flow diagram of reconstruction of a sampling sequence.

The flow diagram of the adaptive reconstruction method used in the above frequency calculation step is shown in FIG. 3, and the specific method is as follows:
(1) setting α as a phase interval of two sampling points at the new frequency $f_{new}$, namely $$\alpha = 2 \times \frac{f_{new}}{N \times f_{old}},$$

wherein $f_{new}$ is the newest frequency estimated value, and $f_{old}$ is the previous frequency estimated value;
(2) calculating variants $$\text{oriInterval} \times \frac{1}{N \times f_{old}} \text{ and newInterval} = \frac{1}{N \times f_{new}};$$

(3) supposing that the current sampling sequence is $V_{old}$ and a new sampling sequence to be calculated is $V_{new}$;
(4) supposing i=0;
(5) calculating $$i \times \frac{\text{newInterval}}{\text{oriInterval}},$$

wherein resampleIndex is a maximum integer not greater than the calculated value;
(6) calculating $$x = i \times \frac{\text{newInterval}}{\text{oriInterval}} - \text{resampleIndex};$$

(7) supposing $z_1=V_{old}$(resampleIndex), $z_2=V_{old}$(resampleIndex+1), i.e., $z_1$ and $z_2$ are respectively a resampleIndex element and a resampleIndex+1 element of the sampling sequence $V_{old}$;
(8) calculating the $i^{th}$ element of $V_{new}$, wherein $$V_{new}(i) = z_1 \cos x\alpha + (z_2 - z_1 \cos \alpha)\frac{\sin x\alpha}{\sin \alpha};$$

(9) supposing i=i+1; if i is equal to M+N, ending the calculation, and obtaining a new sampling sequence $V_{new}$[M+N]; if i is smaller than M+N, returning to step 0. Operations of the TMS320F28335 include three parts: a main program, second interrupt and sampling interrupt. The main program is used for calculating a frequency and sending frequency data to the second data processor via a serial port; the second interrupt is used for processing a GPS/Beidou time signal and calculating time; and the sampling interrupt is used for updating a sampling sequence and triggering frequency calculation.

Figure 4:
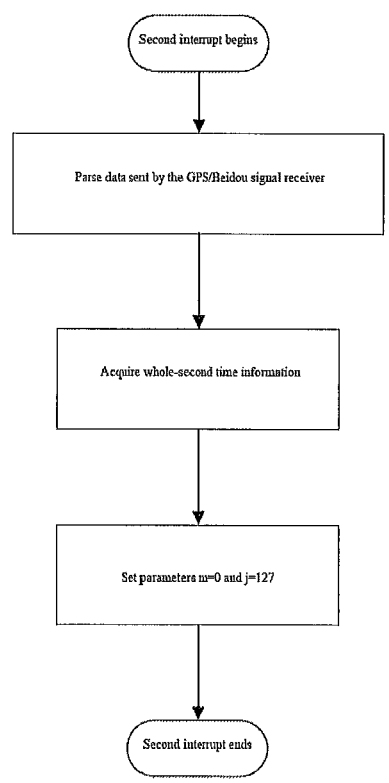
FIG. 4 is a flow diagram of second interrupt processing.

The second interrupt is triggered by a signal sent from the GPS/Beidou signal receiver to the TMS320F28335, then the TMS320F28335 reads the data sent by the receiver, and the receiver sends the signal once every second. The second interrupt flow is shown in FIG. 4, and the specific steps are as follows:
(1) parsing data sent by the receiver;
(2) acquiring whole-second time information; and
(3) setting parameters m=0 and j=127.

Figure 5:
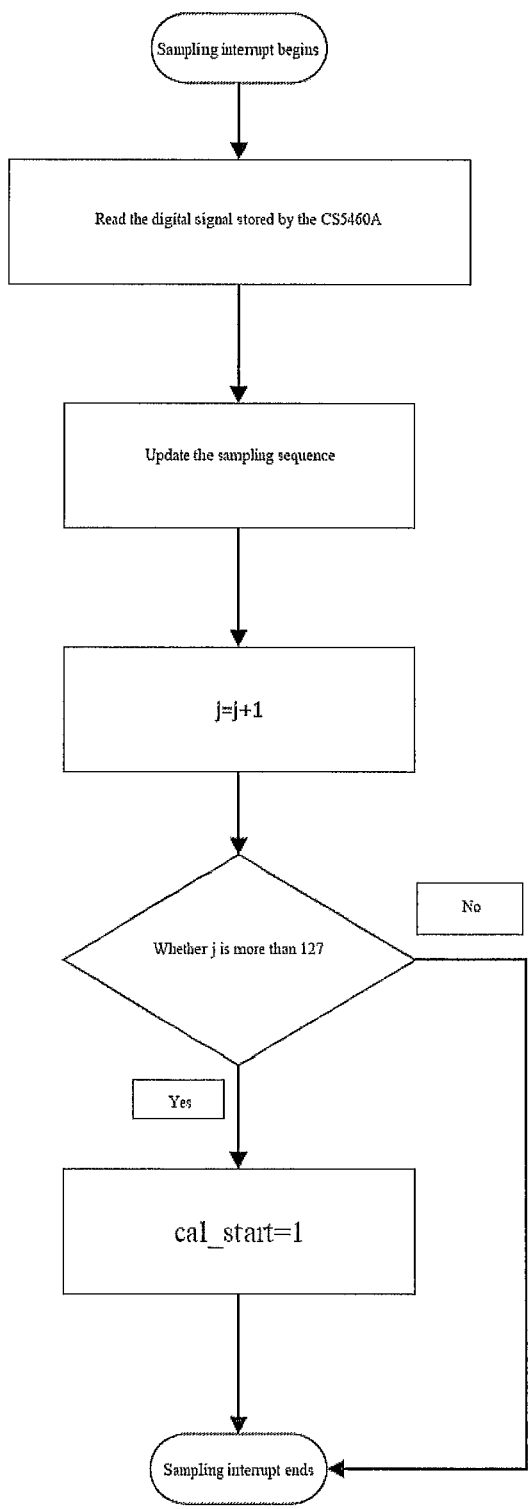
FIG. 5 is a flow diagram of sampling interrupt processing.

The sampling interrupt is triggered by a signal sent from the CS5460A to the TMS320F28335, the CS5460A sends the signal to the TMS320F28335 to trigger the sampling interrupt of the TMS320F28335 after the digital signal converted by the CS5460A is ready, and then the TMS320F28335 reads the digital signal stored by the CS5460A. The sampling interrupt flow is shown in FIG. 5, and the specific steps are as follows:
(1) reading the digital signal stored by the CS5460A;
(2) updating the sampling sequence;
(3) j=j+1; and
(4) if j is more than 127, then cal_start=1.

Figure 6:
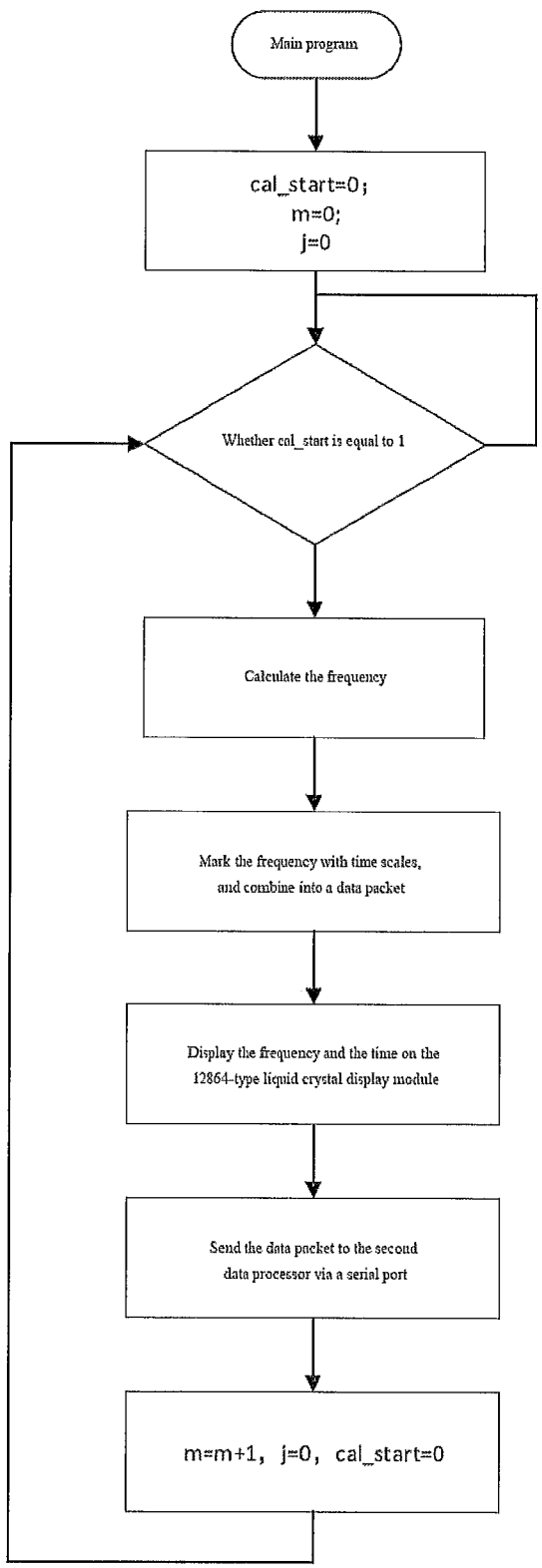
FIG. 6 is a flow diagram of main program processing of a first data processor.

The frequency calculation of the main program of the TMS320F28335 is triggered by a variable cal_start; if cal_start is equal to 1, the calculation begins, otherwise, waiting is kept, and the initial value of cal_start is 0. The flow of the main program is shown in FIG. 6, and the specific steps of the main program are as follows:
0 judging whether cal_start is equal to 1, if so, entering step 0, otherwise, returning to step 0;
0 calculating the frequency according to the aforementioned frequency calculation steps;
0 marking the frequency data with time scales, namely combining the frequency data and the time information into a data packet, e.g., the data packet 20150422095115065000235 indicates 09:51:15 on Apr. 22, 2015, the $6^{th}$ frequency data in the second and the frequency value 50.0235 Hz;
0 sending the frequency and time data to the 12864-type liquid crystal display module, and updating the display content;
0 sending the data packet in the step 0 to the second data processor via a serial port;
0 m=m+1, j=0, cal_start=0;
0 returning to step 0.

The second data processor is of model stm32, and programs running therein mainly include two parts: a parameter setting interrupt program and a serial port interrupt program.

Figure 9:
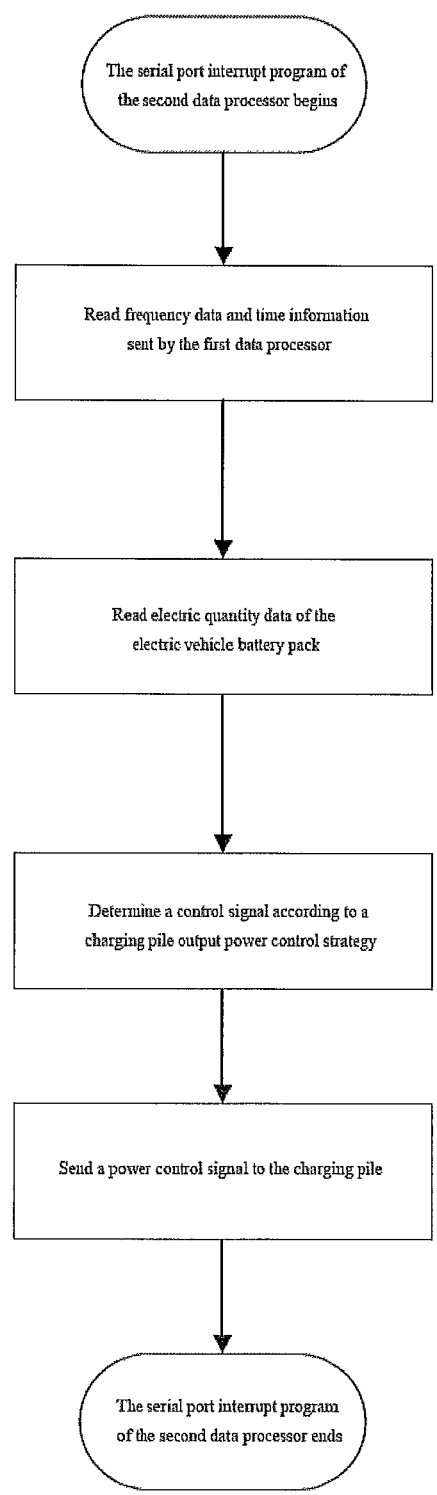
FIG. 9 is a flow diagram of a serial port interrupt program of a second data processor.

The parameter setting interrupt program is triggered by the man-machine interaction device, reads parameter data sent by the man-machine interaction device after being triggered, and then changes corresponding parameters of the charging control system. The serial port interrupt program is triggered by the first data processor; when the first data processor sends data to the second data processor via the serial port, the serial port interrupt program of the second data processor is triggered; and the serial port interrupt program reads frequency data and time information sent by the first data processor, then reads electric quantity data of the electric vehicle battery pack, and finally sends a power control signal to the charging pile according to a charging pile output power control strategy to adjust the output power of the charging pile in real time. The flow diagram of the serial port interrupt program of the second data processor is shown in FIG. 9.

The man-machine interaction device is a touch intelligent color screen module and achieves local setting of parameters of the charging control system, an operator can directly set parameters on the interface in a touch mode, the set parameters are sent to the second data processor, and the parameter setting interrupt program of the second data processor is triggered to achieve parameter setting of the electric vehicle charging pile control system.

The following parameters of the electric vehicle charging pile control system are set by the man-machine interaction device according to actual needs: hysteresis upper limit frequency 1~hysteresis upper limit frequency 4 (freq_op_uplimit1~freq_op_uplimit4), hysteresis lower limit frequency 1~hysteresis lower limit frequency 4 (freq_op_floorlimit1~freq_op_floorlimit4), battery pack electric quantity limit value (elec_quan_limit), charging control enabling time period (time_op), charging control enabling (if_start), etc.; if_start=1 indicates enabling charging control, and if_start=0 indicates closing charging control.

The frequency of the first turn of action of low-frequency load reduction of the power system is smaller than the hysteresis lower limit frequency 1, which is smaller than the hysteresis upper limit frequency 1, which is smaller than the hysteresis lower limit frequency 2, which is smaller than the hysteresis upper limit frequency 2, which is smaller than the hysteresis lower limit frequency 3, which is smaller than the hysteresis upper limit frequency 3, which is smaller than the hysteresis lower limit frequency 4, which is smaller than the hysteresis upper limit frequency 4, which is smaller than 50 Hz.

Suppose that the rated output power of the electric vehicle charging pile is Ps, and the output power of the electric vehicle charging pile is divided into five states in the present invention, respectively a 100% Ps state (indicating that the output power is 100% of Ps), a 75% Ps state (indicating that the output power is 75% of Ps), a 50% Ps state (indicating that the output power is 50% of Ps), a 25% Ps state (indicating that the output power is 25% of Ps), and a 0% Ps state (indicating that the output power is 0% of Ps). The second data processor sends a power control signal to control the charging power of the charging pile to be switched among the five states.

Figure 10:
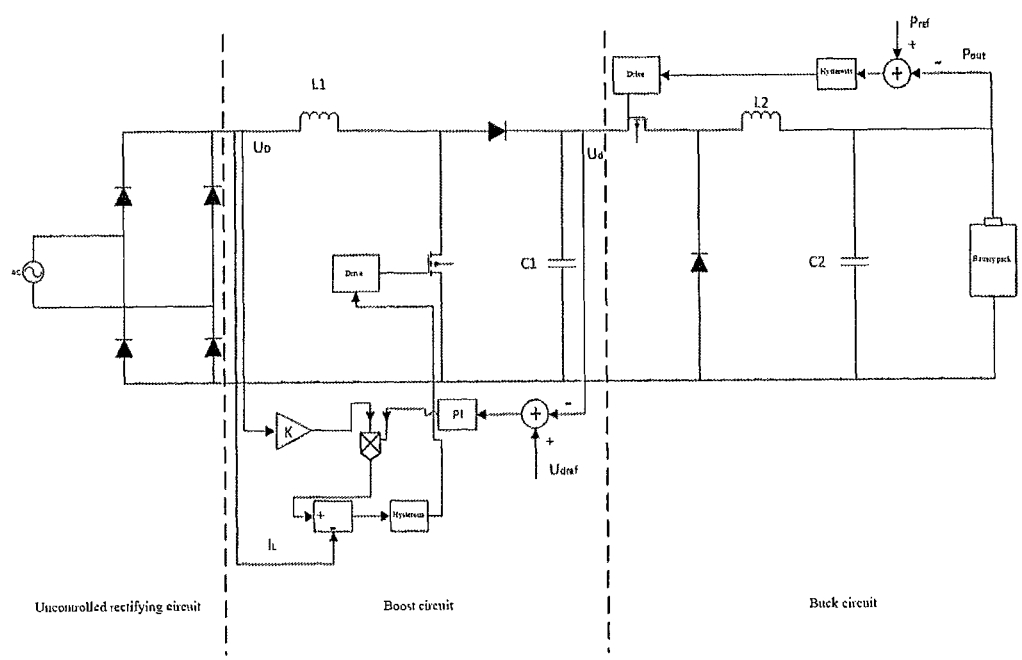
FIG. 10 is a principle diagram of a charging circuit of a charging pile.

The charging power control principle of the charging pile is described in the present invention using a typical direct-current charging pile charging circuit as an example. As shown in FIG. 10, the charging circuit is composed of an uncontrolled rectifying circuit, a Boost circuit and a Buck circuit. The uncontrolled rectifying circuit rectifies alternating-current voltage into direct-current voltage UD; the Boost circuit transforms the direct-current voltage UD into constant direct-current voltage Ud using proportional integral control (PI control), and the value of Ud is determined by a reference value Udref; the Buck circuit controls the output power using power feedback control, so that the output power Pout is equal to a reference value Pref.

Figure 7:
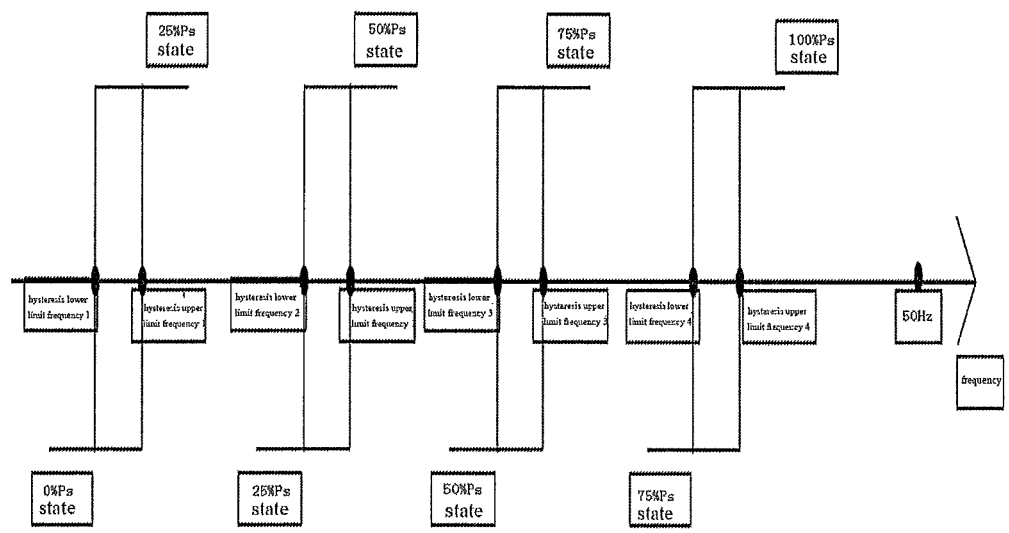
FIG. 7 is a diagram of charging power control logic.
Figure 8:
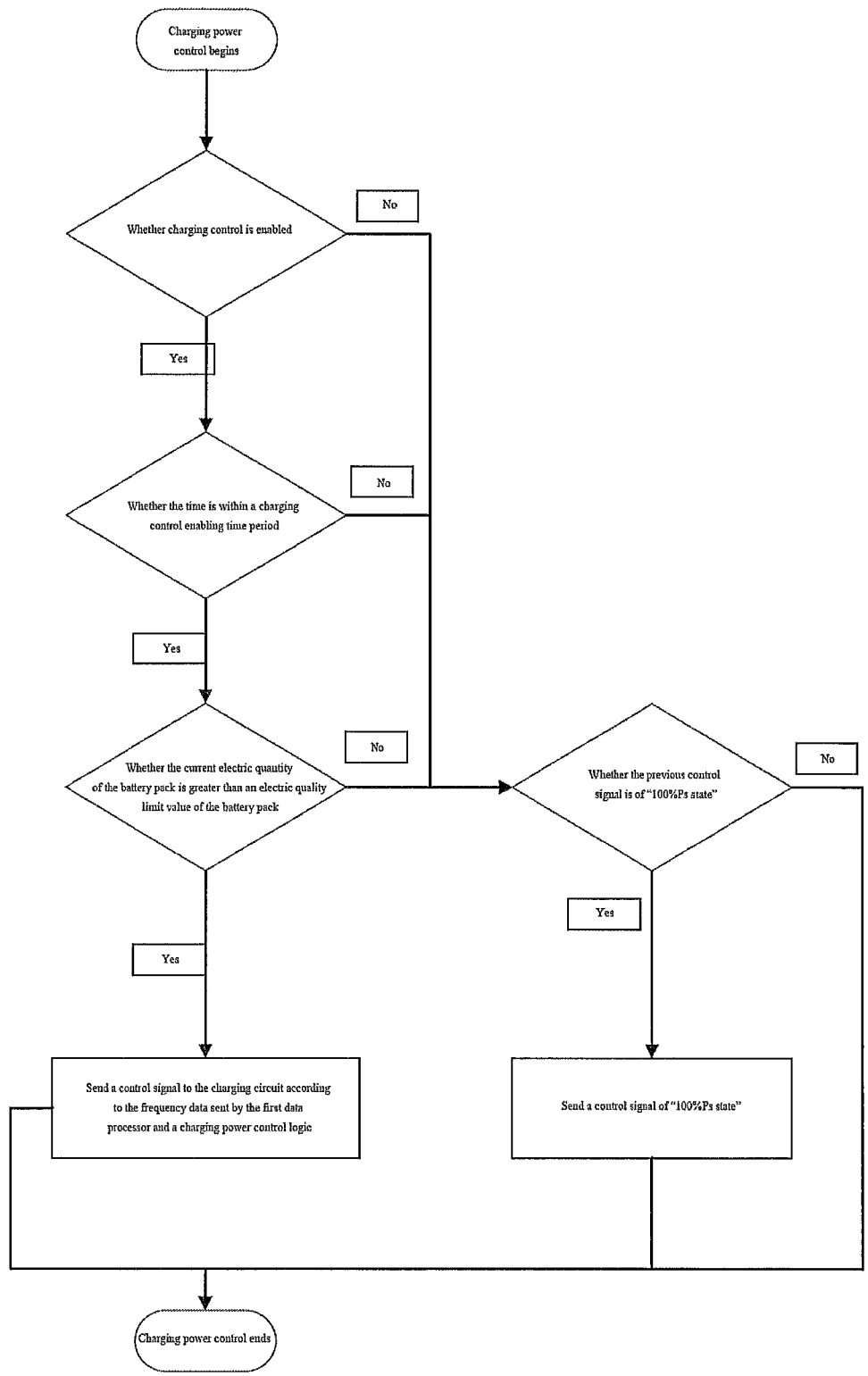
FIG. 8 is a flow diagram of a charging power control strategy.

The second data processor sends a power control signal to change the reference value Pref of a power feedback circuit of the charging pile circuit, so that power control can be achieved, and the output power Pout of the charging pile is Pref. Pref=100% Ps indicates controlling the output power to be 100% of Ps; Pref=75% Ps indicates controlling the output power to be 75% of Ps; Pref=50% Ps indicates controlling the output power to be 50% of Ps; Pref=25% Ps indicates controlling the output power to be 25% of Ps; and Pref=0% Ps indicates controlling the output power to be 0% of Ps. The flow of the charging pile output power control strategy is shown in FIG. 8, and the specific charging pile output power control strategy is as follows:

(1) judging whether a charging control function considering grid frequency safety is enabled, i.e., if if_start=1 indicating enabling the charging control function, entering step 0; if_start=0, i.e., when the charging control function is not enabled, if the previous control signal is of "100% Ps state", not sending a control signal, and if the previous control signal is not of "100% Ps state", sending a control signal of "100% Ps state";

(2) judging whether the time is within a charging control enabling time period according to the time information sent by the first data processor, if so, entering step 0; when the time is not within the time period, if the previous control signal is of "100% Ps state", not sending a control signal, and if the previous control signal is not of "100% Ps state", sending a control signal of "100% Ps state";

(3) judging whether the current electric quantity of the battery pack is greater than an electric quality limit value of the battery pack according to the electric quantity data information of the electric vehicle battery pack, if so, entering step 0; when the current electric quantity is smaller than or equal to the electric quality limit value of the battery pack, if the previous control signal is of "100% Ps state", not sending a control signal, and if the previous control signal is not of "100% Ps state", sending a control signal of "100% Ps state";

(4) judging a frequency safety state according to the frequency data sent by the first data processor and a charging power control logic, and sending a power control signal to the charging circuit. In combination with FIG. 7, the charging power control logic is as follows:

a) when the previous control signal is of "0% Ps state", if the current frequency is smaller than or equal to the hysteresis upper limit frequency 1, not sending a control signal; if the current frequency is greater than or equal to the hysteresis upper limit frequency 1 and smaller than or equal to the hysteresis upper limit frequency 2, sending a control signal of "25% Ps state"; if the current frequency is greater than or equal to the hysteresis upper limit frequency 2 and smaller than or equal to the hysteresis upper limit frequency 3, sending a control signal of "50% Ps state"; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";

b) when the previous control signal is of "25% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis upper limit frequency 2, not sending a control signal; if the current frequency is greater than or equal to the hysteresis upper limit frequency 2 and smaller than or equal to the hysteresis upper limit frequency 3, sending a control signal of "50% Ps state"; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";

c) when the previous control signal is of "50% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to the hysteresis upper limit frequency 3, not sending a control signal; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";

d) when the previous control signal is of "75% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to the hysteresis lower limit frequency 3, sending a control signal of "50% Ps state"; if the current frequency is greater than or equal to the hysteresis lower limit frequency 3 and smaller than or equal to the hysteresis upper limit frequency 4, not sending a control signal; if the current frequency is greater than or equal to the hysteresis upper limit frequency 4, sending a control signal of "100% Ps state";

e) when the previous control signal is of "100% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to the hysteresis lower limit frequency 3, sending a control signal of "50% Ps state"; if the current frequency is greater than or equal to the hysteresis lower limit frequency 3 and smaller than or equal to the hysteresis lower limit frequency 4, sending a control signal of "75% Ps state"; if the current frequency is greater than or equal to the hysteresis lower limit frequency 4, not sending a control signal.

The specific embodiments of the present invention are described above in combination with the accompanying drawings, but do not limit the protection scope of the present invention. It should be appreciated by those skilled in the art that various modifications or variations made by those skilled in the art without any creative effort based on the technical solutions of the present invention shall still fall into the protection scope of the present invention.

The invention claimed is:

1. An electric vehicle charging pile control system considering grid frequency safety, comprising a grid single-phase power input port, a voltage transformer, an AD conversion chip, a first data processor, a second data processor, a data real-time display device, a GPS or Beidou signal receiver and a man-machine interaction device, wherein
the grid single-phase power input port, the voltage transformer, the AD conversion chip, the first data processor and the second data processor are connected successively; the first data processor is further connected with the data real-time display device and the GPS or Beidou signal receiver respectively; the second data processor communicates with an electric vehicle charging pile and an electric vehicle battery pack respectively; and the second data processor is further connected with the man-machine interaction device.

2. The electric vehicle charging pile control system considering grid frequency safety according to claim 1, wherein the first data processor comprise a main program, second interrupt and sampling interrupt; the main program is used for calculating a frequency and sending frequency data to the second data processor via a serial port; the second interrupt is used for processing a GPS or Beidou time signal and calculating time; and the sampling interrupt is used for updating a sampling sequence and triggering frequency calculation.

3. The electric vehicle charging pile control system considering grid frequency safety according to claim 1, wherein operations of the second data processor comprise a parameter setting interrupt program and a serial port interrupt program;
wherein the parameter setting interrupt program is triggered by the man-machine interaction device, reads parameter data sent by the man-machine interaction device after being triggered, and then changes corresponding parameters of the charging control system; the serial port interrupt program is triggered by the first data processor, reads frequency data and time information sent by the first data processor after being triggered, then reads electric quantity data of the electric vehicle battery pack, and finally sends a power control signal to the charging pile according to a charging pile output power control strategy to adjust the output power of the charging pile in real time.

4. A method for controlling an electric vehicle charging pile control system,
wherein the electric vehicle charging pile control system comprises a grid single-phase power input port, a voltage transformer, a AD conversion chip, a first data processor, a second data processor, a data real-time display device, a GPS or Beidou signal receiver and a man-machine interaction device, and wherein the grid single-phase power input port, the voltage transformer, the AD conversion chip, the first data processor and the second data processor are connected successively; the first data processor is further connected with the data real-time display device and the GPS or Beidou signal receiver respectively; the second data processor communicates with an electric vehicle charging pile and an electric vehicle battery pack respectively; and the second data processor is further connected with the man-machine interaction device,
the method comprising:
(1) converting a grid alternating-current voltage signal into a digital signal and storing the digital signal in the AD conversion chip, thus accomplishing sampling of voltage;
(2) reading voltage sampling data and current geographic information data, calculating the frequency of voltage based on the voltage sampling data and displaying the frequency of voltage using the first data processor;
(3) superimposing the frequency data onto the current geographic information data and then sending the superimposed data to the second data processor; and
(4) reading the frequency data of the first data processor, the geographic information data and the electric quantity data of the electric vehicle battery pack using the second data processor, and sending a power control signal to the charging pile according to a charging pile output power control strategy to adjust the output power of the charging pile in real time.

5. The method according to claim 4, wherein said calculating the frequency of voltage based on the voltage sampling data in step (2) comprises:

(2-1) supposing that the frequency updating number is cal_num, the initial value of cal_num is 0, the current frequency estimated value is $f_{old}$, the initial value of $f_{old}$ is 50 Hz, the sampling number of each cycle of waves at the frequency is N and N is a positive integer;

(2-2) supposing a sampling sequence is V[M+N], wherein M+N is the length of the sampling sequence and M is a positive integer;

(2-3) calculating a phase sequence θ[M] using a recursive discrete Fourier phasor analysis method, wherein M is the length of the phase sequence;

(2-4) calculating a phase difference sequence Δθ[M] according to the phase sequence, wherein M is the length of the phase sequence; setting the phase difference as a constant quadratic equation: $\Delta\theta(k)=a_0+a_1 k+a_2 k^2$, wherein $a_0$, $a_1$ and $a_2$ are constant coefficients, and k=0, 1, 2, . . . , M; then indicating the phase difference sequence in a matrix form:

$$\begin{bmatrix} \Delta\theta_0 \\ \Delta\theta_1 \\ \cdots \\ \cdots \\ \Delta\theta_{M-1} \end{bmatrix} = \begin{bmatrix} 0 & 0 & 0 \\ 0 & 2-1 & 2^2-1 \\ \cdots & \cdots & \cdots \\ \cdots & \cdots & \cdots \\ 0 & (M-1)-1 & (M-1)^2-1 \end{bmatrix} \begin{bmatrix} a_0 \\ a_1 \\ a_2 \end{bmatrix};$$

abbreviating as Δθ=Xa, and calculating a coefficient matrix $a=[X^T X]^{-1} X^T \Delta\theta$, wherein $$a = \begin{bmatrix} a_0 \\ a_1 \\ a_2 \end{bmatrix};$$

(2-5) calculating a frequency offset Δf, and updating the frequency estimated value $f_{new}=f_{old}+\Delta f$;

(2-6) supposing $f_{old}=f_{new}$; adding 1 to the frequency updating number, namely cal_num=cal_num+1; if cal_num is equal to 2, ending the frequency calculation, wherein the calculation result is the newest frequency estimated value $f_{new}$; if cal_num is smaller than 2, entering step (2-7);

(2-7) adaptively reconstructing the waveform of the sampling sequence based on the newest frequency estimated value $f_{new}$ to obtain a sampling sequence V[M+N] corresponding to the newest frequency estimated value $f_{new}$;

(2-8) returning to step (2-2) for further calculation.

6. The method according to claim 5, wherein said adaptively reconstructing the waveform of the sampling sequence in step (2-7) comprises:

(2-7-1) setting α as a phase interval of two sampling points at the new frequency $f_{new}$, calculating variants $$\text{oriInterval} \times \frac{1}{N \times f_{old}} \text{ and newInterval} = \frac{1}{N \times f_{new}};$$

wherein $f_{new}$ is the newest frequency estimated value, $f_{old}$ is the previous frequency estimated value, and N is the sampling number of each cycle of waves;

(2-7-2) supposing that the current sampling sequence is $V_{old}$, a new sampling sequence to be calculated is $V_{new}$, and i=0;

(2-7-3) calculating a phase interval coefficient $$x = i \times \frac{\text{newInterval}}{\text{oriInterval}} - \text{resampleIndex};$$

wherein resampleIndex is a maximum integer not greater than $$i \times \frac{\text{newInterval}}{\text{oriInterval}},$$

(2-7-4) supposing $z_1=V_{old}(\text{resampleIndex})$, $z_2=V_{old}(\text{resampleIndex}+1)$, i.e., $z_1$ and $z_2$ are respectively a resampleIndex element and a resampleIndex+1 element of the sampling sequence $V_{old}$;

(2-7-5) calculating the $i^{th}$ element value of $V_{new}$, wherein $$V_{new}(i) = z_1 \cos x\alpha + (z_2 - z_1 \cos\alpha)\frac{\sin x\alpha}{\sin\alpha};$$

(2-7-6) supposing i=i+1, if i is equal to M+N, ending the calculation, and obtaining a new sampling sequence $V_{new}[M+N]$; if i is smaller than M+N, returning to step (2-7-3) for further calculation.

7. The method according to claim 4, wherein said superimposing the frequency data in step (3) comprises:
triggering, by a signal sent from the GPS or Beidou signal receiver to the first data processor, a second interrupt program of the first data processor; parsing, by the first data processor, data sent by the receiver to obtain time information of a whole second; then combining the frequency data and the time information into a data packet, and sending the data packet to the second data processor.

8. The method according to claim 4, wherein the charging pile output power control strategy in step (4) comprises:

(4-1) judging whether a charging control function considering grid frequency safety is enabled, if so, entering step (4-2);
otherwise, judging whether the previous control signal is of "100% Ps state", if so, not sending a control signal, otherwise, sending a control signal of "100% Ps state";

(4-2) judging whether the time is within a charging control enabling time period according to the time information sent by the first data processor, if so, entering step (4-3);
otherwise, judging whether the previous control signal is of "100% Ps state", if so, not sending a control signal, otherwise, sending a control signal of "100% Ps state";

(4-3) judging whether the current electric quantity of the battery pack is greater than an electric quality limit value of the battery pack according to the electric quantity data information of the electric vehicle battery pack, if so, entering step (4-4);
if the current electric quantity is smaller than or equal to the electric quality limit value of the battery pack, judging whether the previous control signal is of "100% Ps state", if so, not sending a control signal, otherwise, sending a control signal of "100% Ps state"; and (4-4) judging a frequency safety state according to the frequency data sent by the first data processor in combination with a charging power control logic, and sending a power control signal to a charging circuit;

wherein Ps is the rated output power of the electric vehicle charging pile; and the "100% Ps state" indicates controlling the output power to be 100% of Ps.

9. The method according to claim 8, wherein the method of step (4-4) comprises:
a) when the previous control signal is of "0% Ps state", if the current frequency is smaller than or equal to a hysteresis upper limit frequency 1, not sending a control signal; if the current frequency is greater than or equal to the hysteresis upper limit frequency 1 and smaller than or equal to a hysteresis upper limit frequency 2, sending a control signal of "25% Ps state"; if the current frequency is greater than or equal to the hysteresis upper limit frequency 2 and smaller than or equal to a hysteresis upper limit frequency 3, sending a control signal of "50% Ps state"; if the current frequency is greater than or equal to the hysteresis upper limit frequency 3 and smaller than or equal to a hysteresis upper limit frequency 4, sending a control signal of "75% Ps state"; if the current frequency is greater than or equal to the hysteresis upper limit frequency 4, sending a control signal of "100% Ps state";
b) when the previous control signal is of "25% Ps state", if the current frequency is smaller than or equal to a hysteresis lower limit frequency 1, sending a control signal of "0% Ps state"; if the current frequency is greater than or equal to the hysteresis lower limit frequency 1 and smaller than or equal to the hysteresis upper limit frequency 2, not sending a control signal; if the current frequency is greater than or equal to the hysteresis upper limit frequency 2 and smaller than or equal to the hysteresis upper limit frequency 3, sending a control signal of "50% Ps state"; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";
c) when the previous control signal is of "50% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to a hysteresis lower limit frequency 2, sending a control signal of "25% Ps state"; if the current frequency is greater than or equal to the hysteresis lower limit frequency 2 and smaller than or equal to the hysteresis upper limit frequency 3, not sending a control signal; if the current frequency is greater than or equal to the hysteresis upper limit frequency 3 and smaller than or equal to the hysteresis upper limit frequency 4, sending a control signal of "75% Ps state"; if the current frequency is greater than or equal to the hysteresis upper limit frequency 4, sending a control signal of "100% Ps state";
d) when the previous control signal is of "75% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to a hysteresis lower limit frequency 3, sending a control signal of "50% Ps state"; if the current frequency is greater than or equal to the hysteresis lower limit frequency 3 and smaller than or equal to the hysteresis upper limit frequency 4, not sending a control signal; if the current frequency is greater than or equal to the hysteresis upper limit frequency 4, sending a control signal of "100% Ps state";
e) when the previous control signal is of "100% Ps state", if the current frequency is smaller than or equal to the hysteresis lower limit frequency 1, sending a control signal of "0% Ps state"; if the current frequency is greater than or equal to the hysteresis lower limit frequency 1 and smaller than or equal to the hysteresis lower limit frequency 2, sending a control signal of "25% Ps state"; if the current frequency is greater than or equal to the hysteresis lower limit frequency 2 and smaller than or equal to the hysteresis lower limit frequency 3, sending a control signal of "50% Ps state"; if the current frequency is greater than or equal to the hysteresis lower limit frequency 3 and smaller than or equal to a hysteresis lower limit frequency 4, sending a control signal of "75% Ps state"; if the current frequency is greater than or equal to the hysteresis lower limit frequency 4, not sending a control signal;
wherein the frequency of the first turn of action of low-frequency load reduction of the power system is smaller than the hysteresis lower limit frequency 1, which is smaller than the hysteresis upper limit frequency 1, which is smaller than the hysteresis lower limit frequency 2, which is smaller than the hysteresis upper limit frequency 2, which is smaller than the hysteresis lower limit frequency 3, which is smaller than the hysteresis upper limit frequency 3, which is smaller than the hysteresis lower limit frequency 4, which is smaller than the hysteresis upper limit frequency 4, which is smaller than 50 Hz; Ps is the rated output power of the electric vehicle charging pile, the "100% Ps state" indicates that the output power is 100% of Ps.

* * * * *